US011089010B2

(12) United States Patent
Gohar et al.

(10) Patent No.: US 11,089,010 B2
(45) Date of Patent: Aug. 10, 2021

(54) METHOD FOR TRANSMITTING DIGITAL INFORMATION

(71) Applicant: TAKLANE, Anneville-sur-Mer (FR)

(72) Inventors: Redwan Pierre Gohar, Paris (FR);
Pascal Baisnee, Anneville-sur-Mer (FR)

(73) Assignee: TAKLANE, Anneville-sur-Mer (FR)

( * ) Notice: Subject to any disclaimer, the term of this patent is extended or adjusted under 35 U.S.C. 154(b) by 169 days.

(21) Appl. No.: 16/540,319

(22) Filed: Aug. 14, 2019

(65) Prior Publication Data

US 2021/0051140 A1    Feb. 18, 2021

(51) Int. Cl.
*G06F 15/16* (2006.01)
*H04L 29/06* (2006.01)
(Continued)

(52) U.S. Cl.
CPC .......... *H04L 63/083* (2013.01); *H04L 67/141* (2013.01); *H04L 67/146* (2013.01);
(Continued)

(58) Field of Classification Search
CPC ..... H04L 67/141; H04L 67/146; H04L 67/02; H04L 67/20; H04L 67/26; H04L 63/083
(Continued)

(56) References Cited

U.S. PATENT DOCUMENTS 8,005,024 B2 * 8/2011 Martinez ................ H04N 7/152
370/261
8,583,912 B2 * 11/2013 Ishikawa ............... H04L 9/0838
713/151

(Continued)

FOREIGN PATENT DOCUMENTS

FR    3045187 B1    1/2018

*Primary Examiner* — Moustafa M Meky
(74) *Attorney, Agent, or Firm* — TraskBritt

(57) ABSTRACT

A method of secure communication between a computer server and users each having a connected computer system, comprising recording of a unique identifier of the server in the memory of a trusted server, the connected system having first and second digital communication modes, the method further comprising: the transmission of an ASC application to the connected system, the application being installed on the connected system, its execution controlling the automatic opening of a computer session with the trusted server according to the second digital communication mode, the opening of a communication session by the connected system with a server, the opening of a secured communication session by the server with the trusted server, the transmission by the server of an identifier of the connected system, the calculation by the trusted server of a time-stamped code associated with the key, the transmission of the time-stamped code by the trusted server to the connected system corresponding to the identifier transmitted by the server, via a first communication protocol, the acquisition of the time-stamped code by the connected system according to the first protocol, the opening of a communication session by the connected system according to a second protocol, with the trusted server through the application previously loaded and transmission of the acquired code, the verification of the conformity of the code transmitted by the connected system, the transmission to the system connected by the trusted server of a digital validation message including a code conformity indicator and information relating to the server associated with the validated code.

6 Claims, 4 Drawing Sheets

(51) Int. Cl.
*H04L 29/08* (2006.01)
*G06Q 20/40* (2012.01)

(52) U.S. Cl.
CPC ............ *G06Q 20/401* (2013.01); *H04L 67/02* (2013.01); *H04L 67/20* (2013.01); *H04L 67/26* (2013.01)

(58) Field of Classification Search
USPC .......................................... 709/200; 713/176
See application file for complete search history.

(56) References Cited

U.S. PATENT DOCUMENTS

| | | | |
|---|---|---|---|
| 10,652,240 B2* | 5/2020 | Brand | ........................ H04L 9/30 |
| 2008/0162929 A1* | 7/2008 | Ishikawa | ............... H04L 9/0833 |
| | | | 713/160 |
| 2008/0212771 A1* | 9/2008 | Hauser | ................ H04L 63/0853 |
| | | | 380/44 |
| 2017/0195298 A1* | 7/2017 | Brand | ................. H04L 63/0442 |
| 2020/0244658 A1* | 7/2020 | Brand | ................... H04L 9/3263 |
| 2021/0099873 A1* | 4/2021 | Windsor | ............. H04W 12/106 |

* cited by examiner

METHOD FOR TRANSMITTING DIGITAL INFORMATION

TECHNICAL FIELD

This invention concerns the field of on-line services accessible via the Internet. Access to remote sites or services is achieved by establishing a communication session between a connected device, such as a computer, tablet or cellular phone, and a server whose address the user knows and enters in a browser, or to which the user accesses via a search engine or by a link transmitted by an electronic message or appearing on the page of another site.

BACKGROUND

From the page viewed, the user then carries out transactions, which may concern sensitive issues, such as the provision of confidential information, the acquisition of products and/or services, commitments or on-line payment.

The development of these transactional means has unfortunately led to the proliferation of fraud. A widespread fraud is called "phishing." This form of hacking is used by fraudsters to try to retrieve information (usually banking information) from Internet users, by duping Internet users through an email that appears to come from a trusted company, typically a bank or an e-commerce site.

The email sent by these hackers impersonates a company (bank, e-commerce site, etc.) and invites the user to connect on-line via a hypertext link and update information about them in a form of a fake web page, a certified copy of the original site, claiming for example an update of the service, technical support intervention, etc.

Thus, through the form, hackers succeed in obtaining the identifiers and passwords of Internet users or personal or banking data (customer number, bank account number, etc.).

Thanks to this data, hackers are able to transfer the money directly to another account or to obtain the necessary data later by smartly using the personal data collected.

Some e-commerce sites claim to be resellers of one or more products of a brand/service. The Internet user who carries out the transaction can only realize the authenticity of the product when it is delivered.

BRIEF SUMMARY

Solutions based on consulting a list of phishing sites are not fully effective because they do not take into account the most recent sites that have not yet been qualified and registered in the database, and cyberfraudsters have developed strategies for very fast changes of phishing site addresses.

To counter these types of fraud, the French patent FR3045187B1 is known in the state of the art. This patent provides an effective response to the above-mentioned problems, but has a security flaw, as data from the trusted server passes through the e-commerce server. For a deployment with a large number of e-commerce servers, it is difficult to guarantee that all will be sufficiently robust to computer attacks; and if the code transmitted by the security server is accessed, the entire process can be corrupted. However, the security server operator generally has no means of verifying the security of the e-commerce servers that are its customers.

In order to remedy these disadvantages, the present disclosure proposes in its most general sense a secure communication method between at least one computer server and users each having at least one connected computer system and comprising an initial step of recording a unique identifier of the computer server in the memory of a trusted computer server, the communication method being characterized in that the connected computer system has a first digital communication mode and a second digital communication mode, and in that the method further comprises the following steps:

Initial steps including:
  the transmission of an ASC application to the connected computer system; and
  Said ASC application being installed on the connected computer system, its execution controlling the automatic opening of a computer session with the trusted server according to the second digital communication mode;

Steps for validating information presented on the connected system including:
  an operation to open a communication session by the connected system with a computer server;
  an operation to open a secure communication session by the computer server with the trusted server, and to transmit by the computer server an identifier of the connected system;
  an operation for calculating by the trusted server a time-stamped code associated with the key;
  an operation for transmitting the time-stamped code by the trusted server to the connected system corresponding to the identifier previously transmitted by the server, via a first communication protocol;
  an acquisition operation of the time-stamped code by the connected system according to a first protocol, and opening a communication session by the connected system according to a second protocol, with the trusted server through the application previously loaded and transmitting the acquired code;
  an operation to verify the conformity of the code transmitted by the connected system; and
  an operation for transmitting to the connected system by the trusted server a digital validation message including a code compliance indicator and information about the server associated with the validated code.

Advantageously, the server verifies the accreditation of the ID of the connected system and/or user and transmits this ID to the trusted server if this verification is positive.

According to a first embodiment, the connected system consists of two devices operating with different communication protocols.

In a second embodiment, the connected system consists of a single device operating with different communication protocols.

Favorably, the digital message is sent by a third party server.

According to a particular embodiment, the digital message sent by a third party server in case of code compliance contains a hypertext link whose activation requires the opening of a session with a payment server or other, for the completion of a secure transaction.

BRIEF DESCRIPTION OF THE DRAWINGS

The present disclosure will be best understood when reading the following description thereof, which relates to a non-limiting exemplary embodiment, while referring to the appended drawings, wherein.

DETAILED DESCRIPTION

General Architecture

Figure 1:
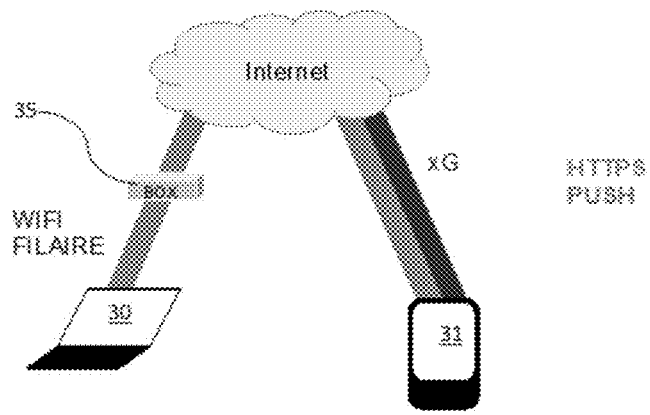
FIG. 1 is a schematic view of a first communication mode of the computer system of the user.

The system implements a trusted server (10) with a memory for recording verified transactional servers (20).

The registration step (step 1) (FIG. 5) is performed by opening a session between an e-commerce server (20) and the trusted server (10) assigning the merchant server (20) a session ID and recording the information related to the site whose security is expected.

This information includes, but is not limited to, a site identifier, such as the root URL address, Mac (Media Access Control1) physical address, IP address and/or other site identification information.

Prior to registration, the authenticity of this information shall be verified in a known manner. The trusted server (10) then calculates a unique key or encryption key, associated with the identifier of the validated site. This key is registered on the e-commerce server (20).

For the purposes of this patent, "e-commerce server" means the server whose contents must be certified. It can be an e-commerce server, but also an information server, and more generally a server for content that the publisher wishes to certify so that the end user can verify that he is consulting the official site, and not a clandestine site imitating the official site to engage in malicious acts such as phishing.

User Equipment

Users use a connected computer system that constitutes:
Either of two separate connected devices, for example:
  a computer or a tablet used as a computer (30) and referred to herein as device or equipment, communicating with the Internet via a TCP/IP protocol, in particular, for exchanges with e-commerce servers (20); and
  a smartphone or a tablet (31), referred to herein as device or equipment, communicating with the trusted server (10) via a GSM network and a protocol such as http or push.

The system can include GPS means for geolocating the distance between PC and telephone and thus provide a means to detect abnormal distance between a telephone and a PC when used in pairing.

In this case, both devices have means of exchanging information, by radio frequency (e.g., Bluetooth or NFC) or sound, or optical (e.g., by displaying a matrix code on the first device and reading this code by the camera of the second device), or by visual reading of an alphanumeric code with manual entry on the second device, or a voice signature and more generally any means of authentication.

Or a single connected equipment with two modes of communication, for example:
  A TCP/IP protocol, particularly for exchanges with e-commerce servers (20)
  A protocol such as HTTP or PUSH for exchanges with the SC trusted server (10)
  Possibly on the same Internet channel.

In this case, a shared memory allows data from one of the channels to be recorded and processed with the processor to control an action on the second communication channel.

FIG. 1 represents a first connectivity mode where the user's connected system consists of two separate devices, a computer (30) and a smartphone device (31).

According to this first variant, each of the equipment (30, 31) has its own communication mode.

The computer (30) communicates with the Internet using the TCP/IP protocol via a box (35) to which it is connected by wire or WIFI.

The smartphone device (31) communicates with the Internet via an xG network, for example, 4G or 5G, via HTTPS or PUSH.

This solution offers the most security because each mode of communication is completely separate, in terms of protocol and number of equipment.

Figure 2:
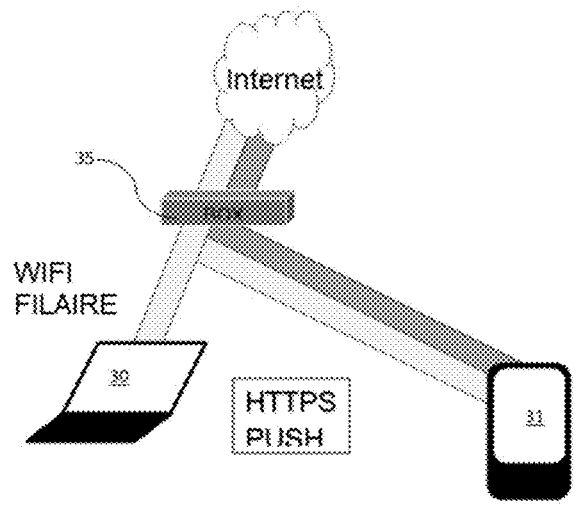
FIG. 2 is a schematic view of a second communication mode of the computer system of the user.

FIG. 2 illustrates a hybrid, domestic situation where the smartphone device (31) uses the same box (35) to which it connects, for example, in WIFI or LIFI, to access the Internet with HTTPS or PUSH protocol.

Figure 3:
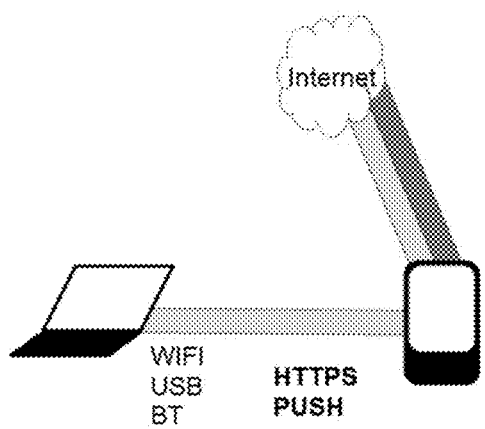
FIG. 3 is a schematic view of a third communication mode of the computer system of the user.

FIG. 3 illustrates another hybrid, mobile situation where the smartphone device (31) communicates with the Internet via an xG network with HTTPS or PUSH, and the computer (30) accesses the Internet via a WIFI, USB or Bluetooth connection with the phone.

Figure 4:
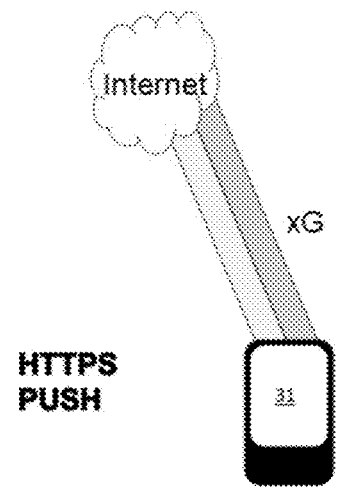
FIG. 4 is a schematic view of a fourth communication mode of the computer system of the user.

FIG. 4 illustrates a different case of usage, where the user's computer system is reduced to a single piece of equipment, for example, a smartphone device (31) connected to the Internet via the xG network, for example, 4G or Wi-Fi, and using two different protocols, TCP/IP for browser-based exchanges with the e-commerce site and HTTPS or PUSH for other communications.

Loading the ASC Application

Figure 5:
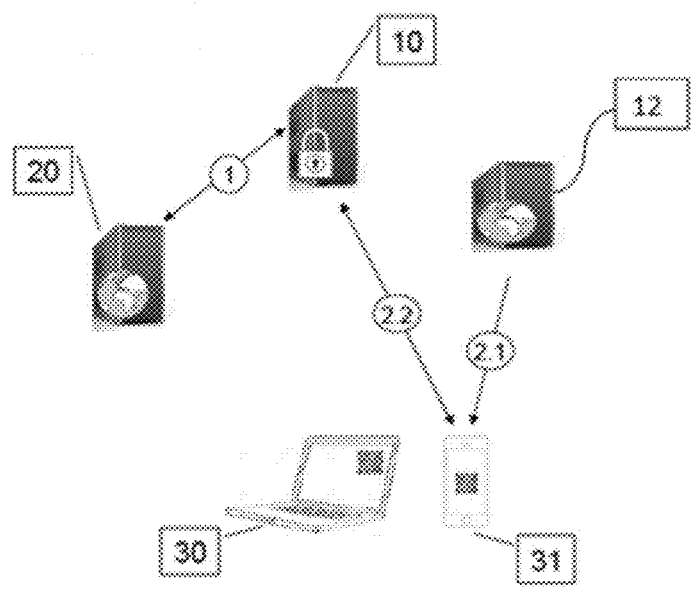
FIG. 5 shows the flowchart of the security application installation step for the embodiment of the present disclosure.

To enable a user to use the security solution proposed by the present disclosure, he first loads an ASC file containing executable computer code onto his connected computer system, as shown in FIG. 5.

This application is installed on one of the devices, namely the smartphone or connected tablet or watch or other mobile smart communication device (31) of the user by downloading either (step 2.1.) from an application download platform (step 2.2) from the trusted server (10). During this operation, the trusted server (10) can optionally provide for an exchange of messages for recording user-specific information, and transmit a session or pairing identifier ("cookie") or more generally a variable that will be recorded on the user's connected equipment (31).

This application can also be installed directly on a single device (30).

Verification of the Authenticity of a Site

Figure 6:
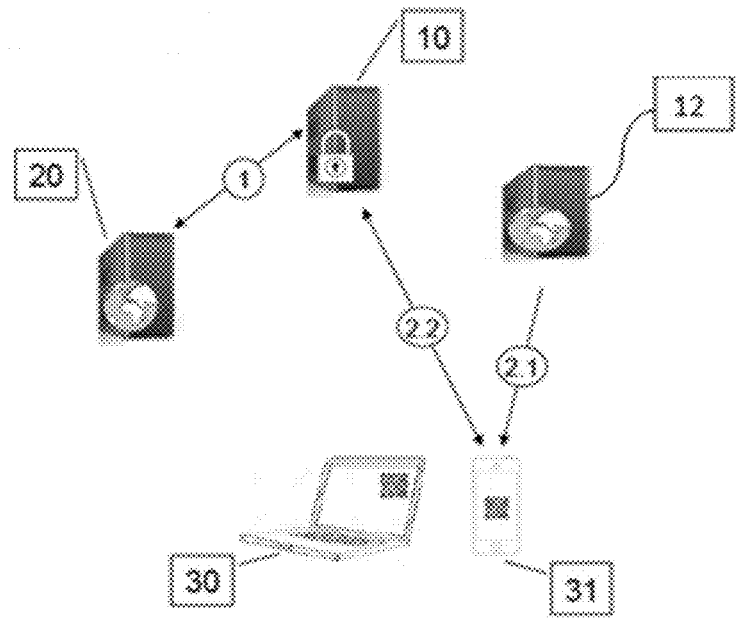
FIG. 6 shows the flowchart of the compliance verification step of a site.

FIG. 6 illustrates an example of a flowchart for verifying the authenticity of a site.

When the user connects to a server (20) with a first connected device (30), for example, via a search engine or by entering the address in the browser bar or by activating a hyperlink, he usually opens a session (step 3) with the server (20) hosting the site corresponding to the address in question using a TCP/IP protocol.

If it is a site previously registered on the trusted server (10), the server (20) opens a session (step 4) via the key assigned to it by the trusted server (10) during the initial registration.

The trusted server (10) then calculates a time-stamped numerical code, which is transmitted (step 5), not to the server (20), but directly to the first connected equipment (30). This code is independent of the server (20).

This code can be displayed in the form of a matrix code of the QR code type or in any other form. The HTML file corresponding to the page integrating this code is transmitted (step 5) to the first connected equipment (30), which controls the display of the page integrating the code displayed in a graphic code (32).

The first connected equipment (30) usually opens a session (step 3) with the server (20) hosting the site corresponding to the address in question, according to a TCP/IP protocol.

The server (20) opens a session (step 4) via the key assigned to it by the trusted server (10) during initial registration, and transmits the identification of the connected equipment (30) in encrypted form to the trusted server (10).

The server (20) may, prior to this transmission of the identifier, carry out local processing to verify the accreditation of the user and/or the first connected equipment (30) corresponding to the identifier.

This verification consists, for example, in checking whether the identifier of the first connected equipment (30) and/or the user is not part of an exclusion blacklist (e.g., fraudulent users, or residents of countries where the server (20) is not allowed). In this case, the server (20) uses the session (opened in step 3) to notify the denial of service.

Otherwise, if local processing allows a transaction to continue, the server (20) opens a session (step 4) with the trusted server (10) to transmit the ID of the connected equipment (30).

Unlike the previous solution proposed by patent FR3045187B1, a computer attack on the server (20) does not compromise the security of the entire process because the codes calculated by the trusted server (10) no longer pass through the server (20).

In addition, this new solution makes it possible to separate the security processings:

- Global processing, against generic frauds such as harpooning, is carried out exclusively by the security server operator, for all servers using the solution
- The processing specific to an e-commerce site's activity is carried out exclusively locally, on the server (20), which makes it possible to adjust very precisely the accreditation choices.

The trusted server (10) then calculates a time-stamped numerical code, which is transmitted (step 5) to the user's first connected equipment (30).

In the example shown in FIG. 6, this code is processed by the first connected equipment (30) to display a graphical representation, for example, a QR code (32), which the user photographs with a second connected equipment (31), for example, a smartphone. This code (32) can also be displayed in alphanumeric characters, to allow the user to enter it manually or by voice with the second connected equipment (31). It can also be transmitted as a sound message recorded by the second connected equipment (31) or as a digital file transmitted to the second connected equipment (31) by NFC, Bluetooth, USB link, for example.

The user can thus perform a verification by scanning the graphic code (32) displayed on a first device (30), for example, a computer or tablet, using a second device (31), separate from the device (30) that established the session with the server (20).

The acquisition of the code (32) by activating the ASC application previously installed on the second equipment (31) leads in step 6.1 to the opening of a session with the trusted server (10) and the transmission by the second equipment (31) of the flashed code. The trusted server (10) compares the transmitted code with the codes generated during the validity period and, if successful, transmits to the second equipment (31) a digital message containing a compliance indicator, for example, a code controls a color range of a first color, as well as information recorded in relation to the site identifier associated with the code (32).

In a step 6.2, the trusted server (10) uses a third-party notification server (12) through a secure dialogue that includes a message with the previously calculated compliance indicator and the user's second equipment (31) identifier.

In a step 6.3, the third-party notification server (12) transmits the compliance message to the second connected equipment (31) of the user with a known identifier.

The user can thus obtain confirmation that the site visited is authentic.

Figure 7:
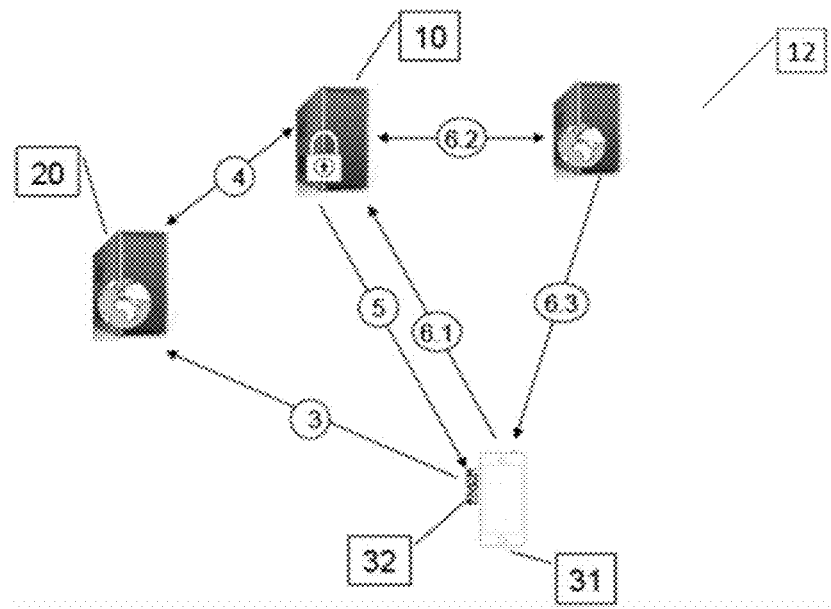
FIG. 7 shows the flowchart of the verification step according to a first embodiment.

In the example shown in FIG. 7, where there is only one device (31), this code is received according to a first protocol (step 5), for example, TCP/IP, and is processed by the connected device (31) that stores it in its memory, and the security application reads this code to return it to the trusted server (10) via a second protocol (step 6.1) from the same connected device (31), for example, PUSH or HTTPS. This situation corresponds, for example, to a hybrid mobile situation.

Regardless of the number of devices, in the case of a fraudulent site, any code simulated by the fraudster will be acquired by the second device (31) and transmitted to the trusted server (10), and will lead to unsuccessful verification processing, which will trigger the sending of a digital alert message.

Pairing Situation

Figure 8:
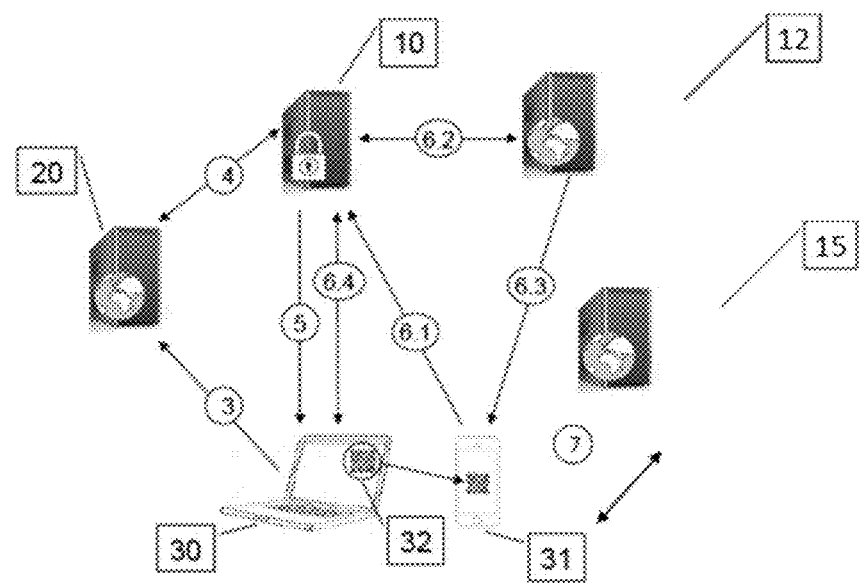
FIG. 8 shows the flowchart of the verification step according to a second embodiment.

In the example shown with reference to FIG. 8, corresponding to a pairing situation, in which a link is created on the trusted server (10) between the first connected equipment (30) and the second connected equipment (31), the steps are as follows.

Steps 3, 4, 5 and 6.1 remain identical to what has been described above.

In step 6.2, the trusted server (10) uses a third-party notification server (12) through a secure dialogue including a message with the compliance indicator and the identification of the user's second connected equipment (31).

In step 6.3, the third-party notification server (12) transmits the compliance message to the second connected equipment (31) of the user with a known identifier.

In a step 6.4, the first connected equipment (30) communicates with the trusted server (10) to indicate the link status with the first connected equipment (30) belonging to the same user's connected system.

The digital message sent in case of compliance may also contain a hypertext link whose activation requires the opening of a session (step 7) with a third-party server (15), for example, a payment server, for the completion of a secure transaction.

Unlike a database or file system, the session keeps the information only for a few minutes. The server creates files stored in a particular directory.

Figure 9:
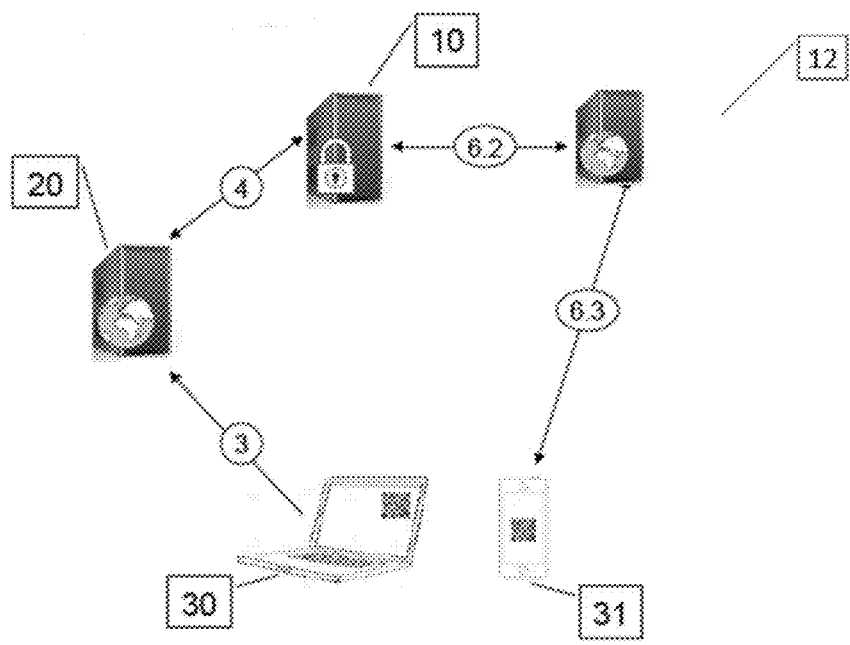
FIG. 9 shows the flowchart of the verification step according to a third embodiment.

FIG. 9 represents a simplified variant in an initial pairing situation where the compliance indicator is simply displayed on the second connected equipment (31).

Sessions are particularly used for applications requiring member spaces and secure access with authentication:
  Management of a shopping cart on an e-commerce site.
  Forms split over several pages.
  Storage of information related to the user's navigation (preferred theme, languages . . . ).

The principle of the present disclosure is to separate the validation of a site from a product on a site and the payment page.

For this purpose, the present disclosure provides for the creation of a chain of at least two numerical codes to certify to the applicant that the code has a precise direction and property whose information he can verify.

This solution removes the "middleman attack" effect by creating a break in the logic of web communication. The "man-in-the-middle (MITM) attack," which is an attack aimed at intercepting communications between two parties, without either party being able to suspect that the communication channel between them has been compromised. The most common channel is a connection to the Internet by the Internet user. The attacker must first be able to observe and intercept messages from one victim to another. The "middle man" attack is particularly applicable in the Diffie-Hellman key exchange method, when used without authentication. With authentication, Diffie-Hellman, on the other hand, is invulnerable to listening to the channel, and is designed for that purpose.

The solution according to the present disclosure provides for the downloading of an application from a secure and trusted download platform to connected equipment, such as a tablet or cell phone.

This application, once loaded, allows it to scan the codes that are activated during its request for certification.

The unique codes created by the trusted server at each request from the web server return to the site for display.

For the applicant it is sufficient to scan the code with the connected equipment into which application was downloaded.

The scanned information is directed to the trusted server that first certifies the code and takes into account the information it has in its database.

It returns to the applicant a certificate associated with different types of information, the details of the code membership (URL of the site, product, brand and site validation (trust code), payment URL).

The invention claimed is:

1. A secure communication method between at least one computer server and users each having at least one connected computer system and including an initial step of recording a unique identifier of the computer server in a memory of a trusted computer server, the communication method being characterized in that the connected computer system has a first digital communication mode and a second digital communication mode, and in that the method further includes the following steps:
  initial steps including:
    transmission of an ASC application to the connected computer system; and
    the application being installed on the connected computer system, its execution controlling an automatic opening of a computer session with the trusted server according to the second digital communication mode;
  steps for validating information presented on the connected system comprising:
    an operation to open a communication session between the connected system and a computer server;
    an operation to open a secure communication session between the computer server and the trusted server, and to transmit by the computer server an identifier of the connected system;
    an operation for calculating by the trusted server a time-stamped code associated with a key;
    an operation for transmitting the time-stamped code by the trusted server to the connected system corresponding to the identifier previously transmitted by the server, via a first communication protocol;
    an operation for acquiring the time-stamped code by the connected system according to a first protocol;
    for opening a communication session between the connected system according to a second protocol, and the trusted server through a previously loaded application and transmitting an acquired code;
    an operation to verify a conformity of the code transmitted by the connected system; and
    an operation for transmitting to the connected system by the trusted server a digital validation message comprising a code compliance indicator and information relating to the server associated with a validated code.

2. The method of claim 1, wherein the server performs a verification of an accreditation of the identifier of the connected system and/or of the user and transmits the identifier to the trusted server in the event that this verification is positive.

3. The method of claim 1, wherein the connected system consists of two devices operating with different communication protocols.

4. The method of claim 1, wherein the connected system consists of a single device operating with different communication protocols.

5. The method of claim 1, wherein the digital message is sent by a third party server.

6. The method of claim 1, wherein the digital message sent by a third party server in the event of code compliance contains a hypertext link whose activation controls the opening of a session with a payment server, for the completion of a secure transaction.

* * * * *